(12) United States Patent
Carlson et al.

(10) Patent No.: US 11,748,109 B2
(45) Date of Patent: *Sep. 5, 2023

(54) SYSTEM AND METHOD FOR IMPLEMENTING STRONG LOAD ORDERING IN A PROCESSOR USING A CIRCULAR ORDERING RING

(71) Applicant: Marvell Asia Pte, Ltd., Singapore (SG)

(72) Inventors: David A. Carlson, Haslet, TX (US); Shubhendu S. Mukherjee, Southborough, MA (US); Wilson P. Snyder, II, Holliston, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,164

(22) Filed: Dec. 2, 2022

(65) Prior Publication Data

US 2023/0099730 A1 Mar. 30, 2023

Related U.S. Application Data

(63) Continuation of application No. 17/587,719, filed on Jan. 28, 2022, now Pat. No. 11,550,590, which is a
(Continued)

(51) Int. Cl.
*G06F 9/38* (2018.01)
*G06F 12/0891* (2016.01)
(Continued)

(52) U.S. Cl.
CPC ........ *G06F 9/3834* (2013.01); *G06F 9/30043* (2013.01); *G06F 9/30101* (2013.01);
(Continued)

(58) Field of Classification Search
CPC ............... G06F 9/3834; G06F 9/30043; G06F 9/30101; G06F 9/3826; G06F 9/3836;
(Continued)

(56) References Cited

U.S. PATENT DOCUMENTS 5,974,523 A 10/1999 Glew et al.
6,266,768 B1 7/2001 Frederick, Jr. et al.
(Continued)

OTHER PUBLICATIONS

Cache Architecture—Arm Developer, ARM940T Technical Reference Manual, Retrieved from Internet at: https://developer.arm.com/docs/ddi0144/latest/caches-and-write-buffer/cache-artitecture; Retrieved from Internet on Feb. 13, 2019.
(Continued)

*Primary Examiner* — Shawn Doman
(74) *Attorney, Agent, or Firm* — Hamilton, Brook, Smith & Reynolds, P.C.

(57) ABSTRACT

A system and corresponding method enforce strong load ordering in a processor. The system comprises an ordering ring that stores entries corresponding to in-flight memory instructions associated with a program order, scanning logic, and recovery logic. The scanning logic scans the ordering ring in response to execution or completion of a given load instruction of the in-flight memory instructions and detects an ordering violation in an event at least one entry of the entries indicates that a younger load instruction has completed and is associated with an invalidated cache line. In response to the ordering violation, the recovery logic allows the given load instruction to complete, flushes the younger load instruction, and restarts execution of the processor after the given load instruction in the program order, causing data returned by the given and younger load instructions to be returned consistent with execution according to the program order to satisfy strong load ordering.

42 Claims, 4 Drawing Sheets

Related U.S. Application Data continuation of application No. 16/525,519, filed on Jul. 29, 2019, now Pat. No. 11,269,644.

(51) Int. Cl.
  *G06F 9/30* (2018.01)
  *G06F 11/07* (2006.01)
  *G06F 12/0864* (2016.01)

(52) U.S. Cl.
  CPC .......... *G06F 9/3826* (2013.01); *G06F 9/3836* (2013.01); *G06F 9/3861* (2013.01); *G06F 11/0793* (2013.01); *G06F 12/0864* (2013.01); *G06F 12/0891* (2013.01)

(58) Field of Classification Search
  CPC ............... G06F 9/3861; G06F 11/0793; G06F 12/0864; G06F 12/0891; G06F 9/30189; G06F 9/3855; G06F 12/0808
  See application file for complete search history.

(56) References Cited

U.S. PATENT DOCUMENTS

| | | | |
|---|---|---|---|
| 11,269,644 | B1 | 3/2022 | Carlson et al. |
| 11,550,590 | B2 | 1/2023 | Carlson et al. |
| 2007/0113020 | A1 | 5/2007 | Gunna et al. |
| 2007/0250669 | A1 | 10/2007 | Arimilli et al. |
| 2009/0319727 | A1 | 12/2009 | Dhodapkar et al. |
| 2012/0117335 | A1 | 5/2012 | Bryant |
| 2014/0129806 | A1 | 5/2014 | Kaplan |
| 2014/0279805 | A1 | 9/2014 | Pangbom et al. |
| 2015/0100765 | A1 | 4/2015 | Abdallah |
| 2015/0205640 | A1 | 7/2015 | Kravitz et al. |
| 2015/0249603 | A1 | 9/2015 | Tompkins et al. |
| 2015/0249604 | A1 | 9/2015 | Folsom et al. |
| 2015/0249620 | A1 | 9/2015 | Folsom et al. |
| 2015/0302133 | A1 | 10/2015 | Ikram et al. |
| 2016/0011876 | A1 | 1/2016 | Mukherjee et al. |
| 2016/0103682 | A1 | 4/2016 | Alexander et al. |
| 2016/0110200 | A1 | 4/2016 | Carlson |
| 2016/0110201 | A1 | 4/2016 | Carlson |
| 2016/0139625 | A1 | 5/2016 | Worrell et al. |
| 2016/0139806 | A1 | 5/2016 | Sanzone et al. |
| 2016/0139829 | A1 | 5/2016 | Sanzone et al. |
| 2016/0246882 | A1 | 8/2016 | Tran et al. |
| 2016/0253417 | A1 | 9/2016 | Tran et al. |
| 2016/0294719 | A1 | 10/2016 | Schmidt et al. |
| 2017/0003905 | A1 | 1/2017 | Mukherjee et al. |
| 2017/0083343 | A1 | 3/2017 | Burger |
| 2017/0212689 | A1 | 7/2017 | Musoll et al. |
| 2018/0095765 | A1 | 4/2018 | Mekkat et al. |
| 2018/0321983 | A1 | 11/2018 | Venkataraman et al. |
| 2018/0341602 | A1 | 11/2018 | Venkataraman et al. |
| 2018/0351692 | A1 | 12/2018 | Rozenboim |
| 2020/0192801 | A1 | 6/2020 | Kaxiras et al. |
| 2020/0394039 | A1 | 12/2020 | Kesiraju et al. |
| 2022/0156080 | A1 | 5/2022 | Carlson et al. |

OTHER PUBLICATIONS

DCache—Arm Developer, ARM940T Technical Reference Manual, Retrieved from Internet at: https://developer.arm.com/docs/ddi0144/latest/caches-and-write-buffer/dcache; Retrieved from Internet on Feb. 13, 2019.

Honarmand, Nina. "Memory Accesses in Out-of-Order Execution." Spring 2015 [retrieved on Aug. 5, 2021]. Retrieved from the Internet: <URL: https://compas.cs.stonybrook.edu/-nhonarmand/courses/sp16/cse502/slides/11-ooo_mem.pdf>.

Oracle, An Oracle White Paper: Handling Memory Ordering in Multithreaded Applications with Oracle Solaris Studio 12, Update 2: Part 2, Memory Barriers, 8 pages (Sep. 2010).

Shore, Chris, "Dealing with memory access ordering in complex embedded designs," Retrieved from Internet at: https://www.embedded.com/print/4437925, 12 pages; Retrieved from Internet on Mar. 20, 2019.

SYSTEM AND METHOD FOR IMPLEMENTING STRONG LOAD ORDERING IN A PROCESSOR USING A CIRCULAR ORDERING RING

RELATED APPLICATIONS

This application is a continuation of U.S. application Ser. No. 17/587,719, filed Jan. 28, 2022, now U.S. Pat. No. 11,550,590, which is a continuation of U.S. application Ser. No. 16/525,519, filed Jul. 29, 2019, now U.S. Pat. No. 11,269,644. The entire teachings of the above applications are incorporated herein by reference.

BACKGROUND

In general, a computer program written by a computer programmer includes a number of operations for accessing memory in the computer system. In the computer program, the memory operations have an order, that is, a program order, that is specified by the computer programmer.

In an out-of-order processor, the memory operations may be executed out-of-order relative to the program order of the computer program. In some examples, such "out-of-order" memory operations have no side effects. In other examples, however, out-of-order memory operations can adversely affect the behavior of the computer program. For example, reordering of a first instruction that writes data to a memory address relative to a second instruction that reads data from that memory address, may result in an incorrect value being read by the second instruction.

To manage out-of-order memory operations, a processor architecture may implement memory barrier (i.e., fence) instructions. Very generally, memory barrier instructions are placed in the computer program by the computer programmer to enforce an ordering constraint on memory operations issued before and after the memory barrier instruction. In some examples, memory operations issued before a memory barrier instruction are guaranteed to have completed before memory operations issued after the memory barrier instruction.

SUMMARY

According to an example embodiment, a system for enforcing strong load ordering in a processor comprises an ordering ring. The ordering ring is configured to store entries corresponding to "in-flight" memory instructions associated with a program order. Such "in-flight" memory instructions are instructions that have been "mapped" by the processor and not yet retired by the processor, as disclosed further below. The system further comprises scanning logic. The scanning logic is configured to scan the ordering ring, in response to execution or completion of a given load instruction of the in-flight memory instructions. The scanning logic detects an ordering violation in an event that at least one entry of the entries stored indicates that a younger load instruction has completed and is associated with an invalidated cache line. The younger load instruction is younger relative to the given load instruction in the program order. For example, the younger load instruction is located after the given load instruction in the program order and, as such, is located later than the given load instruction in the program order. The system further comprises recovery logic. The recovery logic is configured, in response to the ordering violation, to allow the given load instruction to complete, flush the younger load instruction from the processor, and restart execution of the processor after the given load instruction in the program order, causing data returned by the given and younger load instructions to be returned consistent with execution according to the program order to satisfy strong load ordering.

The processor may be an out-of-order processor without native hardware support for strong load ordering.

The processor may be a given processor of a plurality of processors of a multiprocessor chip. Each processor of the plurality of processors may be associated with respective instances of the ordering ring, scanning logic, and recovery logic.

The processor may include an instruction cache. Restarting execution of the processor after the given load instruction may cause the processor to refetch the younger load instruction from the instruction cache and to execute the younger load instruction.

The recovery logic may be further configured to flush each in-flight memory instruction of the in-flight memory instructions that is younger relative to the given load instruction in the program order.

The recovery logic may be further configured to restart execution of the processor at a micro-operation. The micro-operation immediately follows the given load instruction in the program order. For example, a next instruction following the load instruction may include a sequence of micro-operations and execution of the processor may be restarted at an initial micro-operation of the sequence, the initial micro-operation immediately following the given load instruction in the program order.

The entries may be stored in the ordering ring, sequentially, according to the program order that is associated with the in-flight memory operations corresponding to the entries.

Each entry of the entries stored may include a valid entry indicator field, sequence information field, instruction type indicator field, physical address field, completion indicator field, invalidated cache line status indicator field, or a combination thereof.

The valid entry indicator field may be used to store a valid entry indicator that represents whether the entry corresponds to a respective memory instruction that is in-flight.

To flush the younger load instruction, the recovery logic may be further configured to change the valid entry indicator of the at least one entry to indicate that the younger load instruction is not in-flight.

The sequence information field may be used to store sequence information of a respective in-flight memory instruction corresponding to the entry. The sequence information, in combination with a location of the entry in the ordering ring, may identify a sequence number for the respective in-flight memory instruction within the program order. The sequence number may be used for determining age of the respective in-flight memory instruction relative to other in-flight memory instructions associated with the program order.

The scanning logic may be further configured to determine that the younger load instruction is younger, relative to the given load instruction in the program order, as a function of: respective sequence information of respective entries of the ordering ring that correspond to the given and younger load instructions, in combination with respective locations of the respective entries in the ordering ring.

The instruction type indicator field may be used to indicate a memory instruction type of a respective in-flight memory instruction corresponding to the entry. The memory instruction type may be selected from a load instruction type or store instruction type.

The physical address field may be used to store a representation of a physical address of a respective in-flight memory instruction. The representation may be a hash value of the physical address.

The completion indicator field may be used to store a completion indicator to indicate whether a respective in-flight memory instruction corresponding to the entry has completed.

The invalidated cache line status indicator field may be used to store an invalidated cache line status indicator to indicate whether a respective in-flight memory instruction, corresponding to the entry, is associated with a respective invalidated cache line.

The physical address field may be used to store a representation of a physical address of the respective in-flight memory instruction. The invalidated cache line status indicator may be configured in response to invalidation of a cache line of the physical address.

The processor may include memory control logic and a data cache. In an event data stored in the data cache for the physical address does not match with data stored in memory for the physical address, the memory control logic may be configured to invalidate the cache line.

The at least one entry may include an invalidated cache line status indicator configured to indicate whether the younger load instruction is associated with the invalidated cache line. The processor may include a strong load ordering mode setting. The strong load ordering mode setting may be configured to conditionally enable use of the invalidated cache line status indicator for detecting the ordering violation. According to one embodiment, the strong load ordering mode setting may be stored in a control and status register (CSR) of the processor; however, it should be understood that the strong load ordering mode setting may be stored elsewhere, such as in main memory or any other storage location accessible by the scanning logic, and is not limited to being stored in the CSR.

According to another example embodiment, a method for enforcing strong load ordering in a processor comprises storing entries corresponding to in-flight memory instructions associated with a program order. The method further comprises, in response to execution or completion of a given load instruction of the in-flight memory instructions by the processor, scanning the entries stored and detecting an ordering violation in an event at least one entry of the entries stored indicates that a younger load instruction has been completed by the processor and is associated with an invalidated cache line. The younger load instruction is younger relative to the given load instruction in the program order. The method further comprises, in response to the ordering violation detected, allowing the given load instruction to be completed by the processor, flushing the younger load instruction from the processor, and restarting execution of the processor after the given load instruction in the program order, causing data returned by the given load instruction and younger load instruction to be returned consistent with execution according to the program order to satisfy strong load ordering.

Alternative method embodiments parallel those described above in connection with the example system embodiment.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
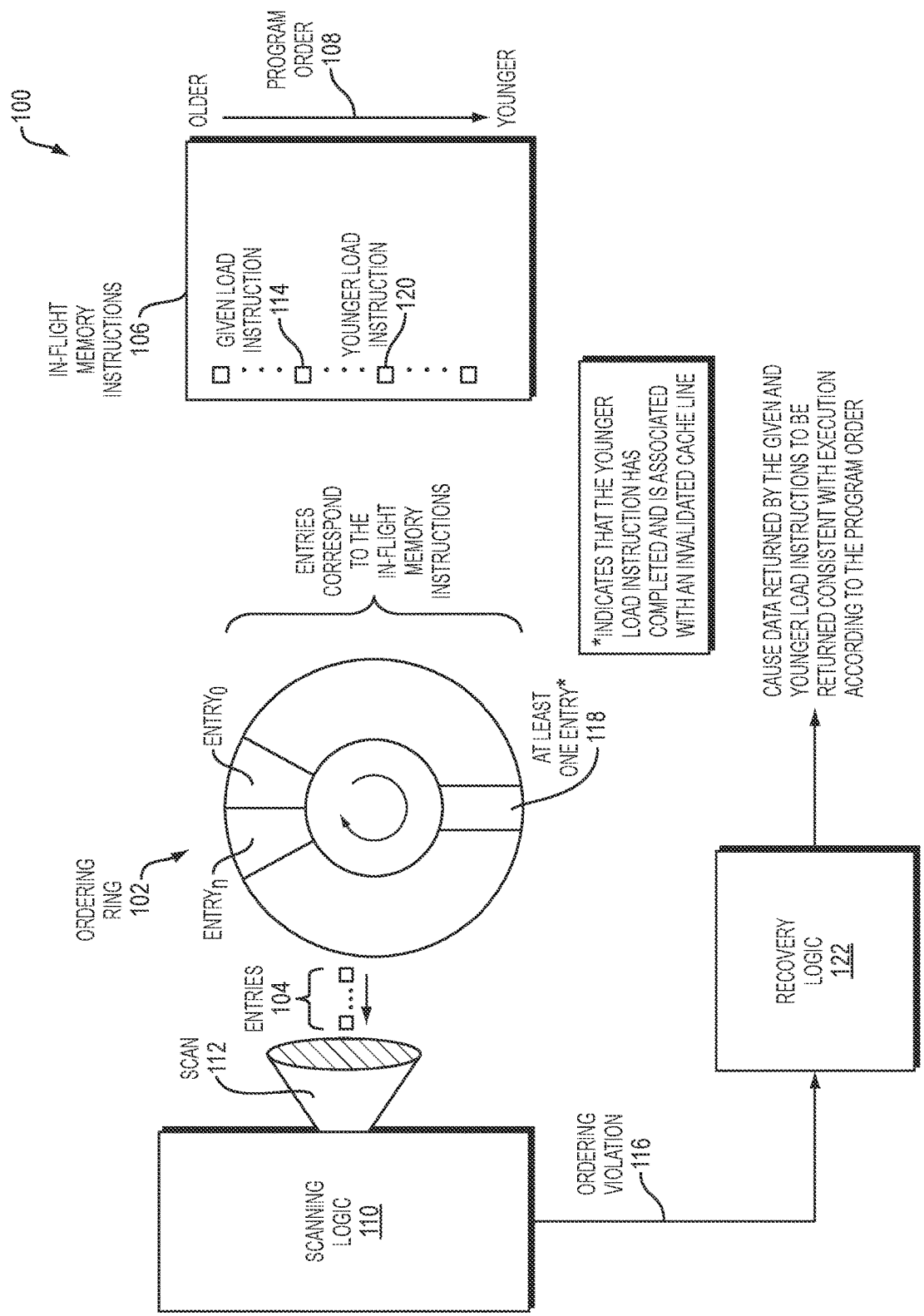
FIG. 1 is a block diagram of an example embodiment of a system for enforcing strong load ordering in a processor.

A description of example embodiments follows.

Out-of-order (OoO) execution is employed by most high-performance processors to make use of instruction cycles that would otherwise be wasted. A processor that executes instructions OoO is referred to as an OoO processor and executes instructions OoO relative to an original order of the instructions in a program, that is, a program order of the instructions that is generated by a compiler. By executing instructions OoO, the OoO processor can avoid being idle while waiting for a preceding instruction to complete and can, in the meantime, process one or more next instructions that are able to run immediately and independently.

A processor architecture of an OoO processor may be such that it does not require an order of memory accesses (i.e., via store and load instructions) to be observed as completing in the same order as the program order and such an architecture may be referred to as a "weakly-ordered" model of memory. Some processor architectures, such as various Arm® processor architectures, may be based on weakly-ordered models of memory and do not require strong load ordering.

For example, in a weakly-ordered model of memory, a processor is able to re-order memory load (i.e., read) instructions, also referred to interchangeably herein as operations, with respect to each other and there is no requirement that the architecture implement strong load ordering. Strong load ordering enables software applications running on the processor to observe all load operations as executing in program order whilst memory locations accessed by the load operations are being altered by an external agent.

Without enforcement of strong load ordering, if the external agent is changing memory accessed by the load instructions, then data returned from the load instructions, executed out-of-order relative to the program order, can be observed by software applications as different relative to data that would otherwise have been returned had the load instructions been executed according to the program order. Such program order is defined by a compiler that generates the load instructions. Strong load ordering ensures that software applications executing on an out-of-order processor observe load instructions as having been executed in program order.

For example, given the following sequence order of load instructions, where A and B are memory locations:

(1) Load A (2) Load B, and the following transitions in values for memory locations A and B:

A B 0 0 (initialized values)

0 2 (external agent changes B)

1 2 (external agent changes A), it would be incorrect to observe that memory location A's value changed to 1 without also observing that memory location B's value changed to 2 because the external agent changed B's value to 2 before A's value was changed to 1. Absent an implementation that enforces strong load ordering, changes to the memory locations A and B may be observed in a wrong order in an event the load instructions (1) and (2) above are executed out-of-order. Such an external agent may be another processor that is different from a processor executing the load instructions (1) and (2) above, or any other external agent, such as an external agent that has access to the memory locations A and B via, for example, a Peripheral Component Interconnect (PCI) Express (PCIe) bus. It should be understood that the external agent may be any agent that is external relative to the processor executing the load instructions (1) and (2) and that access to the memory locations A and B may be made by the external agent via any interface and that such interface is not limited to a PCIe bus.

An example embodiment disclosed herein allows software applications running on an out-of-order processor to observe that all load instructions happen in program order with respect to an external agent that is changing memory accessed by the load instructions. The example embodiment enables the software applications to observe data, returned by the load instructions, to be returned in accordance with the load instructions having been executed according to the program order.

An example embodiment disclosed herein provides strong load ordering for a processor with an architecture that is based on a weakly-ordered memory model. The processor may be an out-of-order processor without native hardware support for strong load ordering. By providing a system for enforcing strong load ordering in such a processor, software developers can advantageously avoid adding memory barrier instructions to their software programs in order to enforce an ordering constraint on memory load operations. Providing strong load ordering for a processor that does not, inherently, enforce same, enables software developers to port software to the processor without having to introduce memory barrier instructions to the software. Adding memory barrier instructions can lead to faulty software execution in an event the memory barrier instructions are not properly placed. Further, adding such memory barrier instructions introduces time in the software development cycle for designing and testing the software that has introduced the memory barrier instructions.

An example embodiment adds an optional mode that can be configured to enable a system for enforcing strong load ordering in a processor, such as in a processor core of the processor cores 420a-k of the network services processor 450 of FIG. 4, disclosed further below. The processor core allows load instructions (also referred to interchangeably herein as "loads") to execute and complete out-of-order with respect to other load instructions and store instructions (also referred to interchangeably herein as "stores") in the program order. An example embodiment adds the optional mode to enable or disable strong load ordering in the processor.

The processor may be an out-of-order processor. Because physical addresses (PAs) are not known until execution time, load-store dependencies cannot be detected until execution time. As such, a mechanism may be employed to detect and recover from load-store dependent pairs which went out-of-order. The detection mechanism is a circular ordering ring, such as the ordering ring 102 of FIG. 1, disclosed further below, where representations of the PAs of all "in-flight" memory operations (i.e., instructions) are stored. Such in-flight memory operations are load and store instructions that have been mapped but not retired by the processor, as disclosed further below.

When a store executes, its PA may be checked against respective PAs of all younger instructions that are younger relative to the store in a program order of a computer program. That is, the younger instructions are later in the program order relative to the store. If a match is found, a store ordering violation may be detected. When a store ordering violation is detected, the store is allowed to complete and the processor is restarted to the microoperation (also referred to interchangeably herein as a "micro-op") after the store instruction in the program order, and a fetcher may be restarted at a program counter (PC) value ahead of the store, for example at the PC+4 of the store. It should be understood that the PC value is not limited to being set to the PC+4 of the store and may be set to more or less than +4 of the PC of the store for such a restart.

An example embodiment disclosed herein introduces an optional mode that may be enabled to detect a load ordering violation, referred to simply as an ordering violation herein. Such detection may be conditionally enabled. In an event such detection is enabled, use of an invalidated cache line status indicator may be enabled for use in generating the ordering violation in order to enforce strong load ordering in the processor in response to same.

According to an example embodiment, adding the optional mode includes adding a bit into entries of the ordering ring, such as the entries 104 of the ordering ring 102 of FIG. 1, disclosed further below. The bit is used to indicate whether a cache line of a completed load instruction has been invalidated. When loads execute (this could be for the first time or re-executing after a memory fill has happened), an example embodiment checks for whether any younger loads that have completed have also been invalidated. If an entry in the ordering ring corresponding to such a younger instruction exists, then the older load instruction, that is a given load instruction that is earlier in the program order relative to the younger instruction, takes an ordering violation.

The older load is allowed to complete and the younger load which has been invalidated is flushed. Execution is restarted at the micro-operation (i.e., micro-op) that follows immediately after the older load instruction in the program order. After a re-fetch, the younger load will execute, most likely miss in a data cache of the processor, and retrieve its data from a memory system of the processor. The ordering of the returned data will now satisfy strong load requirements.

FIG. 1 is a block diagram of an example embodiment of a system 100 for enforcing strong load ordering in a processor (not shown). The system 100 comprises an ordering ring 102 configured to store entries 104 corresponding to in-flight memory instructions 106 associated with a program order 108. The entries 104 may be stored in the ordering ring 102, sequentially, according to the program order 108 that is associated with the in-flight memory operations 106 corresponding to the entries 104.

The system 100 further comprises scanning logic 110 configured to scan 112 the ordering ring 102 in response to execution or completion of a given load instruction 114 of the in-flight memory instructions 106. The scanning logic 110 detects an ordering violation 116 in an event at least one entry 118 of the entries 104 indicates that a younger load instruction 120 has completed and is associated with an invalidated cache line (not shown). The younger load instruction 120 is younger relative to the given load instruction 114 in the program order 108. For example, the younger load instruction 120 is present within the program order 108 after the given load instruction 114. To be "younger" than the given load instruction 114, the younger load instruction 120 is located after the given load instruction 114 in the program order 108 and, thus, is later in the program order 108 than the given load instruction 114.

The system 100 further comprises recovery logic 122. The recovery logic 122 is configured, in response to the ordering violation 116, to allow the given load instruction 114 to complete, flush the younger load instruction 120 from the processor, and restart execution of the processor after the given load instruction 114 in the program order 108, causing data (not shown) returned by the given load instruction 114 and younger load instruction 120 to be returned consistent with execution according to the program order 108 to satisfy strong load ordering.

Flushing the younger load instruction 120 may include deleting information regarding the younger load instruction 120 from an instruction buffer (not shown) of the processor. The instruction buffer may be used to store information regarding in-flight instructions. Such information may identify instructions that can potentially be issued to an execution unit (not shown) for execution but have not yet been issued, and instructions that have been issued but have not yet been committed.

According to one embodiment, the recovery logic 122 may treat the ordering violation 116 as a branch mispredict. For example, when the processor encounters a conditional instruction, such as a branch, it can speculatively begin to execute instructions before it knows for sure whether that particular instruction must be executed or not. The result is, therefore, available sooner if conditions resolve to show the speculation was correct. If, however, the speculation was incorrect, then the branch was mispredicted and a state of the processor is backed up to a state corresponding to an instruction executed just prior to the branch.

According to an example embodiment, in response to the ordering violation 116, the recovery logic 122 may be configured to delete information, associated with all instructions following the given load instruction 114, that is present in a pipeline (not shown) of the processor. For example, all information associated with those instructions may be deleted from the instruction buffer and the valid entry indicator field 203, disclosed further below with regard to FIG. 2, of each entry corresponding to those instructions in the ordering ring 102 may be configured to reflect that those instructions are no longer in-flight. The processor may be backed up to a state in which all effects of those instructions on the processor are reverted and a fetcher (not shown) may be configured to restart at a given program counter (PC) that is associated with a next instruction that immediately follows the given load instruction 114 in the program order 108.

The ordering ring 102 is configured to store a total of n entries, that is, $entry_0$ through $entry_1$. It should be understood, however, that not all of the n entries may be valid, that is, there may entries of the n entries that do not correspond to a given memory instruction that is "in-flight." Such "in-flight" memory instructions are instructions that have been "mapped" by the processor and not yet retired (i.e., committed) by the processor. Instructions that have been mapped by the processor have had all source and destination registers for the instruction converted from architectural registers (ARs), determined by a compiler, to physical registers (PRs) of the processor. Such conversion may be performed via defined mappings therebetween.

According to an example embodiment, a value of n may be 32. As such, the ordering ring 102 may be configured to store a total number of 32 entries corresponding to 32 in-flight memory instructions. It should be understood, however, that the ordering ring 102 is not limited to storing the total number of 32 entries and that a total number of entries that is greater or less than 32 may be stored in the ordering ring 102.

As received instructions (not shown) are fetched from an instruction cache (not shown), they are mapped by the processor in the program order 108 and converted (i.e., transformed) into the in-flight memory instructions 106. As each instruction is mapped, the processor allocates an entry of the ordering ring 102 corresponding to same and updates a valid entry indicator of the entry, as disclosed further below with regard to FIG. 2, to indicate that the corresponding instruction is in-flight. The in-flight memory instruction enters an instruction buffer (not shown) of the processor where it becomes available for execution by an execution unit (not shown) and remains until executed and committed by the processor or otherwise flushed (e.g., deleted or removed), for example, due to the ordering violation 116, misprediction, etc.

If flushed, the processor configures the valid entry indicator of the entry to indicate that the memory instruction corresponding thereto is no longer in-flight. The scanning logic 110 may use the valid indicator to determine whether or not to scan 112 a particular entry. For example, the scanning logic 110 may be configured to bypass scanning of each entry that does not have a respective valid entry indicator configured to indicate that the entry corresponds to a respective memory instruction that is in-flight. The respective memory instruction may not be in-flight because it was executed, completed, and committed by the processor and as such, has been retired by the processor. Alternatively, the respective memory instruction may not be in-flight because the memory instruction was flushed, for example, by the recovery logic 122 in response to the ordering violation 116.

According to an example embodiment, the processor may be a given processor of a plurality of processors of a multiprocessor chip, such as a processor core of the processor cores 420a-k of the network services processor 450 of FIG. 4, disclosed further below. According to an example embodiment, each of the processor cores 420a-k may include respective instances of the ordering ring, scanning logic, and recovery logic.

The processor may include an instruction cache, such as an instance of the instruction cache 452 included in each of the processor cores 420a-k. Restarting execution of the processor after the given load instruction 114 may cause the processor to refetch the younger load instruction 120 from the instruction cache 452 and to execute the younger load instruction 120.

The recovery logic 122 may be further configured to flush each in-flight memory instruction of the in-flight memory instructions 106 that is younger relative to the given load instruction 114 in the program order 108. The recovery logic 122 may restart execution of the processor at a micro-operation (not shown), where the micro-operation immediately follows the given load instruction 114 in the program order 108. After a re-fetch, the younger load will execute, most likely miss in a data cache of the processor, and retrieve its data from a memory system of the processor. The ordering of the returned data will now satisfy strong load requirements.

Figure 2:
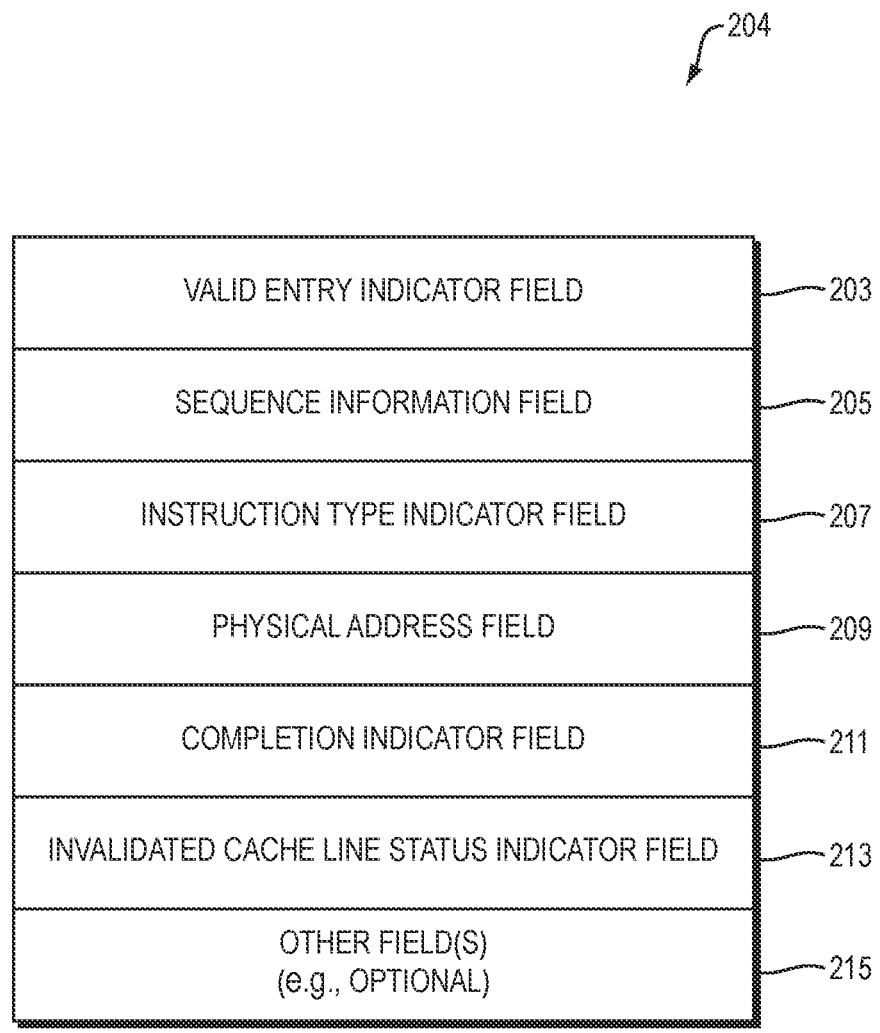
FIG. 2 is a block diagram of an example embodiment of an entry of an ordering ring.

FIG. 2 is a block diagram of an example embodiment of an entry 204 that may be included in the ordering ring 102 of FIG. 1. The entry 204 includes a valid entry indicator field 203, sequence information field 205, instruction type indicator field 207, physical address field 209, completion indicator field 211, and invalidated cache line status indicator field 213.

The valid entry indicator field 203 may be used to store a valid entry indicator (not shown) that represents whether the entry 204 corresponds to a respective memory instruction (not shown) that is in-flight. Referring to FIG. 1 and FIG. 2, to flush the younger load instruction 120, the recovery logic 122 may be further configured to change the valid entry indicator of the at least one entry 118, that is, change a value stored in the valid entry indicator field 203, to indicate that the younger load instruction 120 is no longer in-flight.

The sequence information field 205 may be used to store sequence information (not shown) of the respective in-flight memory instruction. The sequence information, in combination with a location of the entry 204 in the ordering ring 102, may identify a sequence number for the respective in-flight memory instruction within the program order 108. The sequence number may be used for determining age, that is, older or younger, of the respective in-flight memory instruction relative to other in-flight memory instructions associated with the program order 108.

For example, as disclosed above, instructions may be mapped and such mapping of instructions causes the instructions to become "in-flight" instructions. Instructions may be mapped according to the program order 108 and assigned a mapper identifier (ID). The mapper ID may serve as a sequence number used to determine age, that is younger or older, of in-flight instructions relative to one another. To save real estate for storing the ordering ring 102, for example, in the processor, the entries 104 of the ordering ring 102 may store a portion of the mapper ID, such as an upper two bits of a seven-bit mapper ID.

It should be understood that the mapper ID may be any number of bits and is not limited to a seven-bit mapper ID. Further, the portion of the mapper ID that is stored in the entry may be any number of bits and is not limited to the upper two bits. The sequence number for an entry may be derived based on an implied value for a lower portion of the mapper ID in combination with an upper portion that is stored in the entry itself, that is, stored in the sequence information field 205.

For example, if a total number n of entries 104 that can be stored in the ordering ring 102 is 32, then each entry may have an implied value ranging from, for example, 0 to 31, for the lower portion and the sequence number may be determined using the implied value for the lower portion, for example the lower five bits, and the upper two bits, stored in the sequence information field 205, may be combined with same to derive the sequence number. An entry with a sequence number that is lower relative to a sequence number of another entry may be understood to be older relative to the other entry and, thus, an in-flight memory instruction corresponding to that entry may be understood to be older than the other entry.

As such, the scanning logic 110 may be configured to determine that the younger load instruction 120 is younger, relative to the given load instruction 114 in the program order 108, as a function of: respective sequence information of respective entries of the ordering ring 102 that correspond to the given load instruction 114 and younger load instruction 120, in combination with respective locations of the respective entries in the ordering ring 102.

Continuing with reference to FIG. 2, the instruction type indicator field 207 may be used to indicate a memory instruction type of the respective in-flight memory instruction. The memory instruction type may be selected from a load instruction type or store instruction type. The instruction type indicator field 207 may be used by the scanning logic 110 to bypass entries that are not associated with the load instruction type as the scanning logic 110 is scanning the ordering ring 102. The completion indicator field 211 may be used to store a completion indicator to indicate whether the respective in-flight memory instruction corresponding to the entry has completed.

In general, when a load instruction executes, its virtual address (VA) is computed. A translation lookaside buffer (TLB) (not shown) of the processor is used to translate the VA to a physical address (PA) and to determine whether a copy of that PA is in the data cache. If the mapping can be obtained via the TLB and a copy of that PA is in the data cache, the load completes, that is, data from the data cache for the PA is returned, and the completion indicator field 211 may be updated to reflect same. If not, there is a cache miss, and the processor may send a memory request for the cache line to a memory system (not shown) and, following a delay, the memory system may return the memory request with the value along with early notice to re-execute the load instruction.

Continuing with reference to FIG. 2, the physical address field 209 may be used to store a representation of a physical address (not shown) of the respective in-flight memory instruction. According to one embodiment, the representation may be a hash value (not shown) of the physical address. The hash value may be computed using any hash method known in the art.

The invalidated cache line status indicator field 213 may be used to store an invalidated cache line status indicator to indicate whether the respective in-flight memory is associated with a respective invalidated cache line. The invalidated cache line status indicator may be configured in response to invalidation of a cache line (not shown) of the physical address.

The processor may include memory control logic (not shown) and a data cache, such as the Level-1 data cache 454 disclosed further below with regard to FIG. 4. In an event data stored in the data cache for the physical address does not match with data stored in memory for the physical address, the memory control logic may be configured to invalidate the cache line.

Referring to FIG. 1 and FIG. 2, the at least one entry 118 may include an invalidated cache line status indicator (not shown) stored in the invalidated cache line status indicator field 213 to indicate that the younger load instruction 120 is associated with the invalidated cache line. The memory control logic may be configured to notify the processor in an event data stored for a physical address in the data cache does not match with data stored in a memory system. Such a mismatch may result as a function of an external agent changing the data for the physical address. In response to the notification, the processor may scan the ordering ring 102 for entries with representations of the physical address stored in their respective physical address field 209. Such entries may be updated to configure the invalidated cache line status indicator field 213 to indicate that the physical address is associated with an invalidated cache line.

According to an example embodiment, the processor may include a strong load ordering mode setting (not shown). The strong load ordering mode setting may be configured to conditionally enable use of the invalidated cache line status indicator, stored in the invalidated cache line status indicator field 213, for detecting the ordering violation 116. As such, configuration of the strong load ordering mode setting controls whether or not strong load ordering is enforced by the system 100. According to an example embodiment, the strong load ordering mode setting may be stored in a control and status register (CSR) (not shown) of the processor. The strong load ordering mode setting is, however, not limited to being stored in the CSR.

It should be understood that the entry 204 may include other fields 215, optionally. For example, the entry 204 may include a mask field (not shown), used for storing a mask applied to data read or written by the respective memory instruction, or any other fields for storing information associated with the respective memory instruction.

Figure 3:
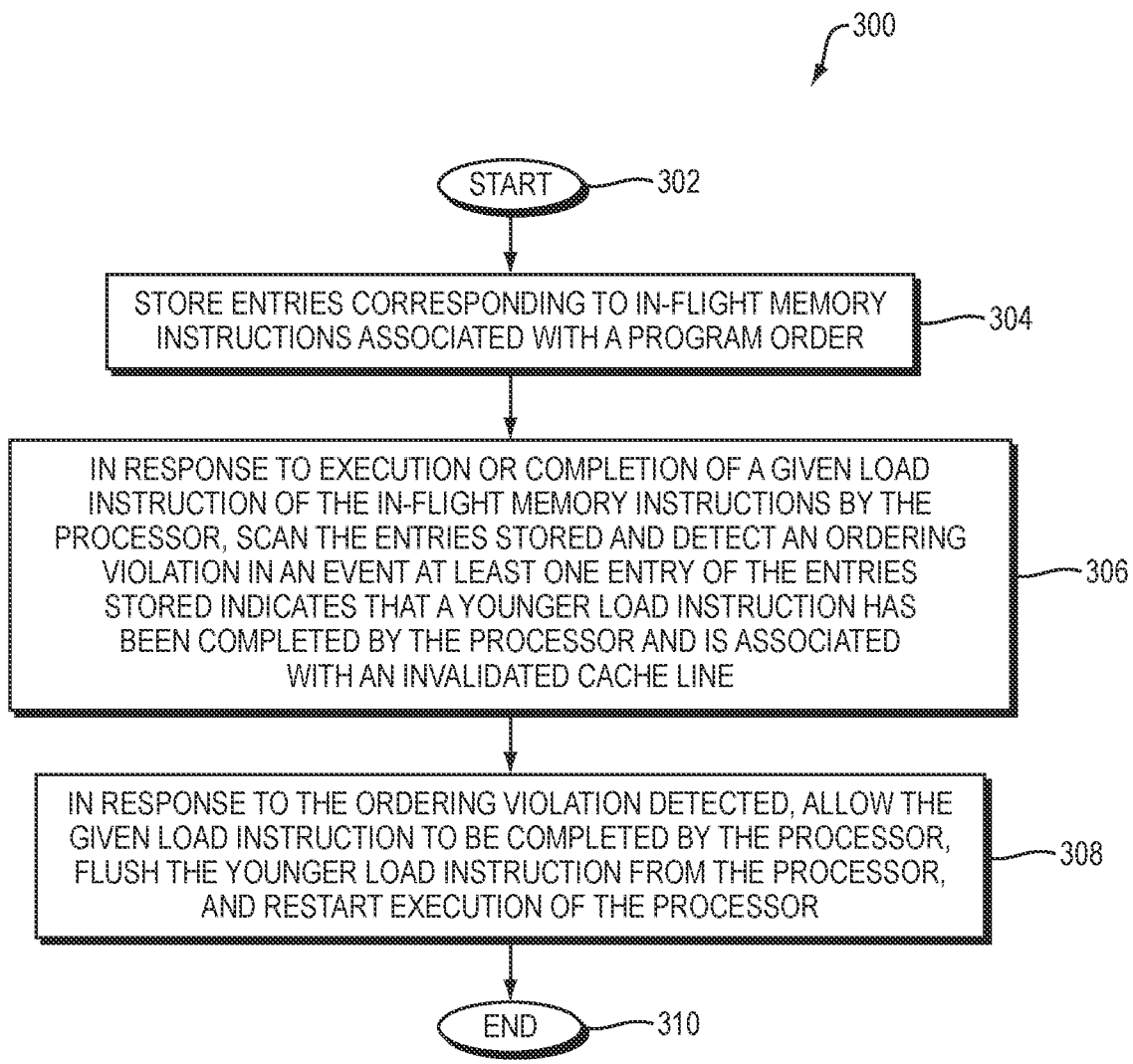
FIG. 3 is a flow diagram of an example embodiment of a method for enforcing strong load ordering in a processor.

FIG. 3 is a flow diagram 300 of an example embodiment of a method for enforcing strong load ordering in a processor. The method begins (302) and stores entries corresponding to in-flight memory instructions associated with a program order (304). In response to execution or completion of a given load instruction of the in-flight memory instructions by the processor, the method scans the entries stored and detects an ordering violation in an event at least one entry of the entries stored indicates that a younger load instruction has been completed by the processor and is associated with an invalidated cache line (306). The younger load instruction is younger relative to the given load instruction in the program order. In response to the ordering violation detected, the method allows the given load instruction to be completed by the processor, flushes the younger load instruction from the processor, and restarts execution of the processor after the given load instruction in the program order, causing data returned by the given load instruction and younger load instruction to be returned consistent with execution according to the program order, thereby satisfying strong load ordering (308), and the method thereafter ends (310) in the example embodiment.

The processor may include an instruction cache. Restarting execution of the processor after the given load instruction may include causing the processor to refetch the younger load instruction from the instruction cache and to execute the younger load instruction. The method may further comprise flushing each in-flight memory instruction of the in-flight memory instructions that is younger relative to the given load instruction in the program order. Restarting execution of the processor may include restarting execution at a micro-operation, the micro-operation immediately following the given load instruction in the program order.

Storing the entries may include storing the entries in the ordering ring, sequentially, according to the program order associated with the in-flight memory operations corresponding to the entries. The method may further comprise including, in each entry of the entries stored, a valid entry indicator field, sequence information field, instruction type indicator field, physical address field, completion indicator field, invalidated cache line status indicator field, or a combination thereof.

The method may further comprise using the valid entry indicator field to store a valid entry indicator representing whether the entry corresponds to a respective memory instruction that is in-flight. Flushing the younger load instruction may include changing the valid entry indicator of the at least one entry to indicate that the younger load instruction is not in-flight.

The method may further comprise using the sequence information field to store sequence information of a respective in-flight memory instruction corresponding to the entry, identifying a sequence number for the respective in-flight memory instruction within the program order based on the sequence information, in combination with a location of the entry in the ordering ring, and using the sequence number for determining age of the respective in-flight memory instruction, relative to other in-flight memory instructions associated with the program order. The method may further comprise using the sequence information field to store sequence information and determining that the younger load instruction is younger relative to the given load instruction in the program order as a function of: respective sequence information of respective entries of the ordering ring that correspond to the given and younger load instructions, in combination with respective locations of the respective entries in the ordering ring.

The method may further comprise using the instruction type indicator field to indicate a memory instruction type of a respective in-flight memory instruction corresponding to the entry, wherein the memory instruction type is selected from a load instruction type or store instruction type.

The method may further comprise using the physical address field to store a representation of a physical address of a respective in-flight memory instruction. The representation may be a hash value of the physical address.

The method may further comprise using the completion indicator field to store a completion indicator to indicate whether a respective in-flight memory instruction, corresponding to the entry, has completed.

The method may further comprise using the invalidated cache line status indicator field to store an invalidated cache line status indicator to indicate whether a respective in-flight memory instruction, corresponding to the entry, is associated with a respective invalidated cache line. The method may further comprise using the physical address field to store a representation of a physical address of the respective in-flight memory instruction and configuring the invalidated cache line status indicator in response to invalidation of a cache line of the physical address. The processor may include a data cache and the method may further comprise invalidating the cache line, in an event data stored in the data cache for the physical address does not match with data stored in memory for the physical address.

The at least one entry may include an invalidated cache line status indicator configured to indicate whether the younger load instruction is associated with the invalidated cache line and the method may further comprise using a strong load ordering mode setting to conditionally enable use of the invalidated cache line status indicator for detecting the ordering violation. The method may further comprise storing the strong load ordering mode setting in a control and status register (CSR) of the processor.

Figure 4:
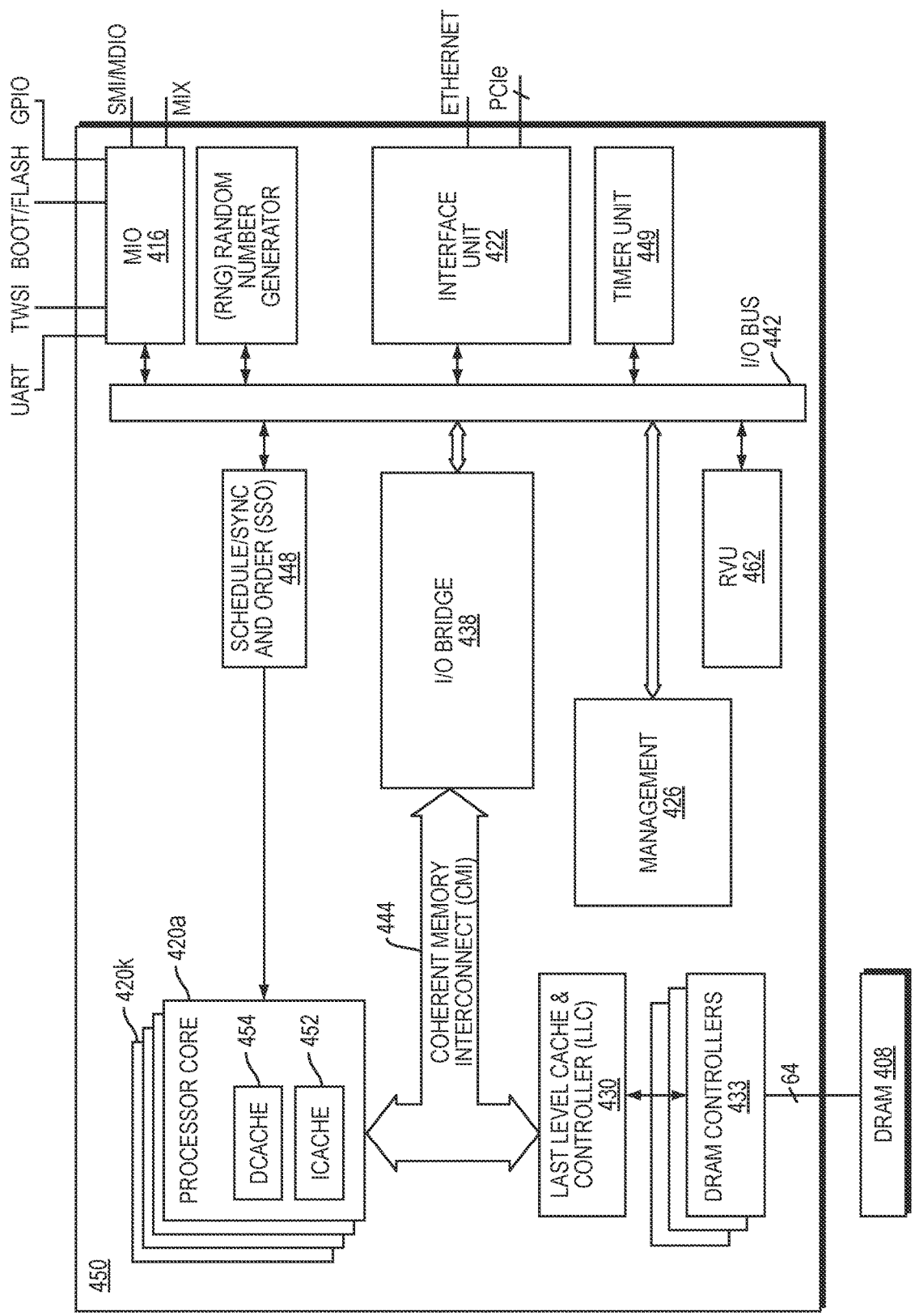
FIG. 4 is a block diagram of an example embodiment of a network services processor in which an example embodiment may be implemented.

FIG. 4 is a block diagram of an example embodiment of a network services processor 450 in which an example embodiment disclosed herein may be implemented. The network services processor 450 may process Open System Interconnection network L2-L7 layer protocols encapsulated in received packets. As is well-known to those skilled in the art, the Open System Interconnection (OSI) reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 450 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor 450 does not slow down the network data transfer rate.

A packet is received for processing by an interface unit 422. The interface unit 422 performs pre-processing of the received packet by checking various fields in the network protocol headers (e.g., L2, L3 and L4 headers) included in the received packet, and may perform checksum checks for TCP/User Datagram Protocol (UDP) (L3 network protocols). The interface unit 422 may receive packets via multiple network interface protocols, such as Ethernet and Peripheral Component Interconnect Express (PCIe). In a further embodiment, the interface unit 422 may be configured to receive packets from a plurality of X Attachment Unit Interfaces (XAUI), Reduced X Attachment Unit Interfaces (RXAUI), Serial Gigabit Media Independent Interfaces (SGMII), 40GBASE-R, 50GBASE-R, and/or 100GBASE-R. The interface unit 422 may also prepare and transmit outgoing packets via one or more of the aforementioned interfaces.

The interface unit 422 may write packet data into buffers in the last level cache and controller (LLC) 430 or external DRAM 408. The packet data may be written into the buffers in a format convenient to higher-layer software executed in at least one processor core of the processor cores 420*a-k*. Thus, further processing of higher level network protocols is facilitated.

According to an example embodiment, each processor of the plurality of processor cores 420*a-k* may be associated with respective instances of the ordering ring 102, scanning logic 110, and recovery logic 122 of FIG. 1, disclosed above. As such, each processor of the plurality of processor cores 420*a-k* may be configured to enforce strong load ordering.

The network services processor 450 can also include one or more application specific co-processors. These co-processors, when included, offload some of the processing from the processor cores 420*a-k*, thereby enabling the network services processor 450 to achieve high-throughput packet processing.

An I/O bridge 438 is configured to manage the overall protocol and arbitration and provide coherent I/O portioning with an I/O Bus 442. The I/O bridge 438 may include buffer queues for storing information to be transferred between a coherent memory interconnect (CMI) 444, the I/O Bus 442, and the interface unit 422. The I/O bridge 438 may comprise a plurality of individual bridges on which communications and arbitration can be distributed.

The miscellaneous I/O interface (MIO) 416 can include auxiliary interfaces such as General Purpose I/O (GPIO), Flash, IEEE 802 two-wire Management Data I/O Interface (MDIO), Serial Management Interface (SMI), Universal Asynchronous Receiver-Transmitters (UARTs), two-wire serial interface (TWSI), and other serial interfaces.

A Schedule/Sync and Order (SSO) module 448 queues and schedules work for the processor cores 420*a-k*. Work is queued by adding a work queue entry to a queue. For example, a work queue entry is added by the interface unit 422 for each packet arrival. A timer unit 449 is used to schedule work for the processor cores 420*a-k*.

The processor cores 420*a-k* request work from the SSO module 448. The SSO module 448 selects (i.e., schedules) work for one of the processor cores 420*a-k* and returns a pointer to the work queue entry describing the work to a given processor core of the processor cores 420*a-k*.

Each processor core includes an instruction cache 452 and Level-1 data cache 454. In one embodiment, the network services processor 450 includes 24 processor cores 420*a-k*. In some embodiments, each of the processor cores 420*a-k* may be an implementation of the Arm architecture, such as the Armv8.2 64-bit architecture, and may be compatible with the Armv8.2 software ecosystem and include hardware floating point, single instruction multiple data (SIMD), and memory management unit (MMU) support. In such an embodiment, consistent with the Armv8.2 architecture, the processor cores 420*a-k* may contain full hardware support for virtualization. Guest operating systems can thus run at Arm defined user and operating system privilege levels, and hypervisor software can run in a separate higher privilege level. The processor cores 420*a-k* may also support a secure state in which software may run in three different privilege levels while hardware provides isolation from the non-secure state. It should be understood that a total number of the processor cores 420*a-k* is not limited to 24 and that an architecture of the processor cores 420*a-k* is not limited to a 64-bit architecture or to the Armv8.2 64-bit architecture.

Last level cache and controller (LLC) 430 and external DRAM 408 are shared by all of the processor cores 420*a-k* and I/O co-processor devices (not shown). Each processor core is coupled to the LLC 430 by the CMI 444. The CMI 444 is a communication channel for all memory and I/O transactions between the processor cores 420*a-k*, the I/O bridge 438 and the LLC 430. In one embodiment, the CMI 444 is scalable to multiple (e.g., 24) processor cores 420*a-k*, supporting fully-coherent Level-1 data caches 454 with write through. The CMI 444 may be highly-buffered with the ability to prioritize I/O.

The controller of the LLC 430 maintains memory reference coherence. It returns the latest copy of a block for every fill request, whether the block is stored in LLC 430, in external DRAM 408, or is "in-flight." A plurality of DRAM controllers 433 supports the external DRAM 408, and can support preferred protocols, such as the DDR4 protocol.

After a packet has been processed by the processor cores 420*a-k*, the interface unit 422 reads the packet data from the LLC 430, DRAM 408, performs L4 network protocol post-processing (e.g., generates a TCP/UDP checksum), forwards the packet through the interface unit 422 and frees the LLC 430/DRAM 408 used by the packet. The DRAM Controllers 433 manage in-flight transactions (loads/stores) to/from the DRAM 408.

A resource virtualization unit (RVU) 462 may enable software to map various local function (LF) resources in various modules into several physical functions (PFs) and virtual functions (VFs). This enables multi-unit software drivers compatible with Linux®, Windows® and the data plane development kit (DPDK).

A management module 426 may include various units for managing operation of the network services processor 450. For example, the management module 426 may include a temperature sensor, a power serial bus master interface to determine current performance and energy consumption, and a memory diagnostic controller to detect and report memory errors. The management module 426 may further include control processors, such as a system control processor for power management and other secure chip management tasks, and a module control processor for module management and other non-secure chip management tasks.

While example embodiments have been particularly shown and described, it will be understood by those skilled in the art that various changes in form and details may be made therein without departing from the scope of the embodiments encompassed by the appended claims.

What is claimed is:

1. A system comprising:
a circular ordering ring configured to store entries corresponding to in-flight memory instructions associated with a program order;
scanning logic configured to scan the circular ordering ring to detect an ordering violation based on:
a) an age for a load instruction derived by combining a first portion of first sequence information with a second portion of the first sequence information, the first portion of the first sequence information stored in a first entry of the circular ordering ring that corresponds to the load instruction, the second portion of the first sequence information implied based on a respective location of the first entry in the circular ordering ring, and
b) an age for an other load instruction derived by combining a first portion of second sequence information with a second portion of the second sequence information, the first portion of the second sequence information stored in a second entry of the circular ordering ring that corresponds to the other load instruction, the second portion of the second sequence information implied based on a respective location of the second entry in the circular ordering ring; and
recovery logic configured, in response to the ordering violation detected, to cause data returned by the load instruction and the other load instruction to be returned consistent with execution according to the program order to satisfy strong load ordering.

2. The system of claim 1, wherein the processor is an out-of-order processor without native hardware support for strong load ordering.

3. The system of claim 1, wherein the processor is a processor of a plurality of processors of a multiprocessor chip and wherein each processor of the plurality of processors is associated with respective instances of the circular ordering ring, scanning logic, and recovery logic.

4. The system of claim 1, wherein the processor includes an instruction cache and wherein the recovery logic is further configured, in response to the ordering violation detected, to restart execution of the processor after the other load instruction, causing the processor to refetch the load instruction from the instruction cache and to execute the load instruction.

5. The system of claim 1, wherein the recovery logic is further configured to flush each in-flight memory instruction of the in-flight memory instructions that is younger relative to the other load instruction in the program order.

6. The system of claim 1, wherein the recovery logic is further configured to restart execution of the processor at a micro-operation, the micro-operation immediately following the other load instruction in the program order.

7. The system of claim 1, wherein the entries are stored in the circular ordering ring, sequentially, according to the program order associated with the in-flight memory operations corresponding to the entries.

8. The system of claim 1, wherein each entry of the entries stored includes a valid entry indicator field, sequence information field, instruction type indicator field, physical address field, completion indicator field, invalidated cache line status indicator field, or a combination thereof.

9. The system of claim 8, wherein the valid entry indicator field is used to store a valid entry indicator representing whether the entry corresponds to a respective memory instruction that is in-flight.

10. The system of claim 9, wherein, in response to the ordering violation detected, the recovery logic is further configured to allow the other load instruction to complete and flush the load instruction by changing the valid entry indicator of the at least one entry to indicate that the load instruction is not in-flight.

11. The system of claim 8, wherein the sequence information field is used to store sequence information of a respective in-flight memory instruction corresponding to the entry and wherein the sequence information, in combination with a location of the entry in the circular ordering ring, identifies a sequence number for the respective in-flight memory instruction within the program order, the sequence number used for determining age of the respective in-flight memory instruction, relative to other in-flight memory instructions associated with the program order.

12. The system of claim 8, wherein the instruction type indicator field is used to indicate a memory instruction type of a respective in-flight memory instruction corresponding to the entry and wherein the memory instruction type is selected from a load instruction type or store instruction type.

13. The system of claim 8, wherein the physical address field is used to store a representation of a physical address of a respective in-flight memory instruction corresponding to the entry.

14. The system of claim 13, wherein the representation is a hash value of the physical address.

15. The system of claim 8, wherein the completion indicator field is used to store a completion indicator to indicate whether a respective in-flight memory instruction, corresponding to the entry, has completed.

16. The system of claim 8, wherein the invalidated cache line status indicator field is used to store an invalidated cache line status indicator to indicate whether a respective in-flight memory instruction, corresponding to the entry, is associated with a respective invalidated cache line.

17. The system of claim 16, wherein the physical address field is used to store a representation of a physical address of the respective in-flight memory instruction and wherein the invalidated cache line status indicator is configured in response to invalidation of a cache line of the physical address.

18. The system of claim 16, wherein the processor includes memory control logic and a data cache and wherein, in an event data stored in the data cache for the physical address does not match with data stored in memory for the physical address, the memory control logic is configured to invalidate the cache line.

19. The system of claim 1, wherein the scanning logic is further configured to detect the ordering violation further based on at least one entry of the entries stored indicating that the load instruction has completed and is associated with an invalidated cache line, wherein the at least one entry includes an invalidated cache line status indicator configured to indicate whether the load instruction is associated with the invalidated cache line, and wherein the processor includes a strong load ordering mode setting, the strong load ordering mode setting configured to conditionally enable use of the invalidated cache line status indicator for detecting the ordering violation.

20. The system of claim 19, wherein the strong load ordering mode setting is stored in a control and status register (CSR) of the processor.

21. The system of claim 1, wherein the scanning logic is further configured to scan the circular ordering ring in response to execution or completion of the load instruction of the in-flight memory instructions and to detect the ordering violation further based on at least one entry of the entries stored indicating that the load instruction has completed and is associated with an invalidated cache line.

22. A method comprising:
storing entries, corresponding to in-flight memory instructions associated with a program order in a circular ordering ring;
scanning the entries stored and detecting an ordering violation based on:
a) an age for a load instruction derived by combining a first portion of first sequence information with a second portion of the first sequence information, the first portion of the first sequence information stored in a first entry of the circular ordering ring that corresponds to the load instruction, the second portion of the first sequence information implied based on a respective location of the first entry in the circular ordering ring, and
b) an age for an other load instruction derived by combining a first portion of second sequence information with a second portion of the second sequence information, the first portion of the second sequence information stored in a second entry of the circular ordering ring that corresponds to the other load instruction, the second portion of the second sequence information implied based on a respective location of the second entry in the circular ordering ring; and
in response to the ordering violation detected, causing data returned by the load instruction and the other load instruction to be returned consistent with execution according to the program order to satisfy strong load ordering.

23. The method of claim 22, wherein the processor is an out-of-order processor without native hardware support for strong load ordering.

24. The method of claim 22, wherein the processor is a processor of a plurality of processors of a multiprocessor chip.

25. The method of claim 22, wherein the processor includes an instruction cache and wherein the method further comprises, in response to the ordering violation detected, restarting execution of the processor after the load instruction includes causing the processor to refetch the load instruction from the instruction cache and to execute the load instruction.

26. The method of claim 22, further comprising flushing each in-flight memory instruction of the in-flight memory instructions that is younger relative to the other load instruction in the program order.

27. The method of claim 22, wherein restarting execution of the processor includes restarting execution at a micro-operation, the micro-operation immediately following the other load instruction in the program order.

28. The method of claim 22, wherein storing the entries includes storing the entries in the circular ordering ring, sequentially, according to the program order associated with the in-flight memory operations corresponding to the entries.

29. The method of claim 22, further comprising including, in each entry of the entries stored, a valid entry indicator field, sequence information field, instruction type indicator field, physical address field, completion indicator field, invalidated cache line status indicator field, or a combination thereof.

30. The method of claim 29, further comprising using the valid entry indicator field to store a valid entry indicator representing whether the entry corresponds to a respective memory instruction that is in-flight.

31. The method of claim 30, wherein the method further comprises, in response to the ordering violation detected, allowing the other load instruction to complete and flushing the load instruction, the flushing including changing the valid entry indicator of the at least one entry to indicate that the load instruction is not in-flight.

32. The method of claim 29, further comprising:
using the sequence information field to store sequence information of a respective in-flight memory instruction corresponding to the entry;
identifying a sequence number for the respective in-flight memory instruction within the program order based on the sequence information, in combination with a location of the entry in the circular ordering ring; and
using the sequence number for determining age of the respective in-flight memory instruction, relative to other in-flight memory instruction associated with the program order.

33. The method of claim 29, further comprising using the instruction type indicator field to indicate a memory instruction type of a respective in-flight memory instruction corresponding to the entry, wherein the memory instruction type is selected from a load instruction type or store instruction type.

34. The method of claim 29, further comprising using the physical address field to store a representation of a physical address of a respective in-flight memory instruction corresponding to the entry.

35. The method of claim 34, wherein the representation is a hash value of the physical address.

36. The method of claim 29, further comprising using the completion indicator field to store a completion indicator to indicate whether a respective in-flight memory instruction, corresponding to the entry, has completed.

37. The method of claim 29, further comprising using the invalidated cache line status indicator field to store an invalidated cache line status indicator to indicate whether a respective in-flight memory instruction, corresponding to the entry, is associated with a respective invalidated cache line.

38. The method of claim 37, further comprising using the physical address field to store a representation of a physical address of the respective in-flight memory instruction and configuring the invalidated cache line status indicator in response to invalidation of a cache line of the physical address.

39. The method of claim 37, wherein the processor includes a data cache and wherein the method further comprises invalidating the cache line, in an event data stored in the data cache for the physical address does not match with data stored in memory for the physical address.

40. The method of claim 29, wherein detecting the ordering violation is further based on at least one entry of the entries stored indicating that the load instruction has completed and is associated with an invalidated cache line, wherein the at least one entry includes an invalidated cache line status indicator configured to indicate whether the load instruction is associated with the invalidated cache line, and wherein the method further comprises using a strong load ordering mode setting to conditionally enable use of the invalidated cache line status indicator for detecting the ordering violation.

41. The method of claim 40, further comprising storing the strong load ordering mode setting in a control and status register (CSR) of the processor.

42. The method of claim 22, further comprising scanning the circular ordering ring in response to execution or completion of the load instruction of the in-flight memory instructions and detecting the ordering violation further based on at least one entry of the entries stored indicating that the load instruction has completed and is associated with an invalidated cache line.

* * * * *